3,536,502
COPPER PHTHALOCYANINE PIGMENT COMPOSITIONS
Isaiah Von, Plainfield, and Gordon Herbert Bjorklund, Lebanon, N.J., assignors to American Cyanamid Company, Stamford, Conn., a corporation of Maine
No Drawing. Filed June 17, 1968, Ser. No. 737,338
Int. Cl. C08h *17/02;* C09d *11/00*
U.S. Cl. 106—20     6 Claims

ABSTRACT OF THE DISCLOSURE

This invention provides pigment compositions which include copper phthalocyanine and copper phthalocyanine monosulfonyl chloride or fluoride. The pigment compositions are useful in inks, lacquers, enamels, paints and the like. By blending specific proportions of a copper phthalocyanine monosulfonyl halide with copper phthalocyanine, pigments are obtained which are non-crystallizing and non-flocculating.

BACKGROUND OF THE INVENTION

Various phthalocyanine compositions have been used in the past as pigments in various types of systems. For example, phthalocyanine sulfonic acid derivatives, and blends of phthalocyanine, have been used with certain proportions of phthalocyanine sulfonic acid compounds. Also, phthalocyanine sulfonyl halides in the form of sulfonyl fluoride derivatives have been used as solvent soluble colorants in which the phthalocyanine molecule contained from 2 to 4 sulfonyl fluoride radicals and the phthalocyanine molecule has been substituted by at least one halogen atom.

The phthalocyanine sulfonyl chlorides useful in applicants' pigment composition have been produced by numerous methods. However, these sulfonyl chloride compositions were used as intermediates or starting materials for the preparation of dyestuffs of the phthalocyanine series, usually by a reaction with alcohols or phenols or with amines to form various substituted sulfonamide derivatives. These sulfonamide derivatives were not used in pigment compositions.

DESCRIPTION OF THE INVENTION

The pigment compositions according to this invention are blends made of copper phthalocyanine and a copper phthalocyanine monosulfonyl halide. Usually, the sulfonyl halide derivative comprises at least about 4 parts per 100 parts, each by weight, of copper phthalocyanine. Below 4 parts by weight the resistance to flocculation falls off. A suitable range is about 4–15 parts by weight of the sulfonyl halide derivative per 100 parts by weight of copper phthalocyanine, preferably 8–12 parts per 100 parts. While greater proportions are possible, they tend to be uneconomical.

In preparing the blend, aqueous slurries of copper phthalocyanine and a phthalocyanine monosulfonyl halide, or a slurry of one component to which is added the other component in the dry state, may be combined under agitation. Mixing is continued until the desired homogeneity is achieved. Mixing for about 10 minutes to 4 hours at about 10° C. to 100° C. will be effective without causing undue hydrolysis. The combined pigment composition may then be isolated from the aqueous slurry by filtration.

In preparing the pigment composition, it may be desirable to further condition it. For this purpose, conditioning agents may be added to the above combined aqueous slurries before they are filtered. Thus, for example, from about 1 to 6 parts, by weight, of a wood rosin, preferably about 3 parts, may be added to the combined slurries before the pigment composition is isolated by filtration from the combined slurries.

In the preparation of the present pigment composition, the sulfonyl halide derivative ordinarily would not be expected to have stability due to the known tendency of sulfonyl halide radicals to exhibit hydrolysis. However, although a small degree of hydrolysis of the sulfonyl halide to the sulfonic acid may take place in the blends of the present invention, the sulfonyl halide radical remains intact in the final composition to a substantial degree. This can be shown by a comparison of the properties of a composition of the invention containing the sulfonyl halide radical with an analogous composition containing a sulfonic acid. This comparison is made below in Example 10.

The compositions may also be prepared as dry blends simply by admixing copper phthalocyanine and the copper phthalocyanine sulfonyl halide, each in the dry state, as by grinding in a mortar or other suitable vessel. Each ingredient may be ground separately and then admixed or the grinding and dry blending may be done simultaneously. The grinding and dry blending usually is continued until a uniform blend of the desired particle size is achieved. Conditioning agents known in the pigment art, such as wood rosin or the like, may be added at any time during the blending operation provided they do not detract from the properties desired in the final blend. Dry blending is the preferred mixing procedure where it is desired to avoid hydrolysis altogether.

The sulfonyl halide derivative used in the composition may be prepared by any of several known methods which involve the reaction of a copper phthalocyanine with chlorosulfonic acid, as disclosed, for example, in U.S. Pat. Nos. 2,219,330 and 2,897,207.

In preparing a monosulfonyl chloride derivative, however, it is necessary to adjust the proportion of chlorosulfonic acid and thionyl chloride used with the copper phthalocyanine. Generally, 10 parts, by weight, of chlorosulfonic acid and 2.5 parts, by weight, of thionyl chloride are used for each part of copper phthalocyanine to make the monosulfonyl chloride derivative. However, this proportion may vary depending on the type and grade of ingredients used.

The corresponding phthalocyanine sulfonyl fluoride derivative may be prepared by a known exchange method whereby the corresponding chloride derivative is reacted with a metallic fluoride salt.

The phthalocyanines which may be used with the sulfonyl halide derivatives to form the compositions of the present invention may be in the form of either the "green shade" form or the "red shade" solvent unstable form. However, it is advantageous to use the "green shade" material since this ordinarily results in more desirable pigments for solvent ink systems. However, depending on the shade of the blue color desired, either the green shade or the red shade product may be used with satisfactory results.

An important feature of the present invention is that a composition which includes a blend of copper phthalocyanine with a copper phthalocyanine monosulfonyl halide, as described herein, provides a valuable pigment composition with substantially all of the sulfonyl halide derivative present in its unhydroylzed form. This feature makes them useful in paints, lacquers, and enamels, and especially useful in solvent ink systems. They impart superior properties of resistance to crystallization and flocculation, transparency, gloss, ink body, and viscosity.

The following examples illustrate the present invention in greater detail by showing the preparation of individual monosulfonyl halide derivatives, and pigment composi-

EXAMPLE 1

Preparation of phthalocyanine monosulfonyl chloride

To 1,000 grams of chlorosulfonic acid there is added 100 grams of a crude copper phthalocyanine. The mixture is heated at 100° C. for about 2 hours. The mixture is then cooled to 80° C., and treated with 250 grams of thionyl chloride and is then maintained at 80° C. for 18 hours. At the end of this time, it is cooled to 10° C., drowned in ice, filtered to isolate the solid, and washed acid free. The product assays one monosulfonyl chloride radical for each phthalocyanine molecule.

EXAMPLE 2

Preparation of phthalocyanine monosulfonyl fluoride

A 56-gram portion of a moist presscake containing 10 grams of copper phthalocyanine monosulfonyl chloride is slurried in a solution of 12 grams of potassium fluoride in 50 ml. of water. The mixture is heated to 110° C., and then heated at the reflux temperature with stirring for about 1 hour. After cooling, the solid material is isolated by filtration and washed alkali free with hot water. When the solid is dried, the copper phthalocyanine monosulfonyl fluoride is obtained. The monosulfonyl fluoride makes up a sustantial part of the product.

EXAMPLE 3

Preparation of a blend with a phthalocyanine sulfonyl chloride derivative

An aqueous slurry is prepared containing about 88 grams of a "green shade" copper phthalocyanine in 2,000 ml. of water. Also, an aqueous slurry is prepared using 9 grams of copper phthalocyanine monosulfonyl chloride, prepared as set forth in Example 1, in 200 grams of water. The two slurries are combined with agitation. The combined pigment composition is then isolated from the slurries by filtration.

If it is desired, the pigment combination can be further conditioned before filtration of the combined slurries. For this purpose, 1 gram of concentrated sulfuric acid is added to the combined slurries, and then a solution is added consisting of 3 grams of wood rosin (wood rosin K) and 150 grams of water containing 2 parts of sodium hydroxide. After stirring the whole mixture at 55° to 60° C., for about 1 hour, the solid is isolated by filtration, washed acid free, and dried at 80° C. The resultant product is the pigment composition.

An alternate rosin conditioning procedure is described as follows:

A filter cake containing 88 parts of a copper phthalocyanine blue (beta-form) and a filter cake containing 9 parts of copper phthalocyanine blue monosulfonyl chloride are slurried in 2,900 parts of water. To this slurry, 2 parts of concentrated sulfuric acid are added and then a solution of sodium rosinate prepared from 3 parts of wood rosin dissolved in about 100 parts of water containing about 1.5 parts of sodium hydroxide. The slurry is stirred for about one hour at 50° C. to 55° C., and then the pigment composition is isolated by filtration, washed acid free with water, and dried at 80° C.

In the above examples, the "red shade" phthalocyanine may be substituted for the "green shade" phthalocyanine product. This results in a satisfactory pigment composition which is a redder shade of blue color.

EXAMPLE 4

Preparation of a blend with a phthalocyanine sulfonyl fluoride derivative

Essentially the same procedure is followed as described in Example 3, with the exception that copper phthalocyanine monosulfonyl fluoride is substituted for the copper phthalocyanine monosulfonyl chloride to produce a blend of copper phthalocyanine with copper phthalocyanine monosulfonyl fluoride.

In order to illustrate the application of the pigment compositions of this invention, the following examples show the use of the present compositions in ink systems such as polyamide flexographic inks and rotogravure inks. Other ink vehicles, too numerous and well known to require listing, may be employed with the pigments of this invention to provide ink compositions having substantially the same excellent resistance to crystallization and flocculation.

EXAMPLE 5

Polyamide flexographic ink composition

A 30-gram portion of a blend of copper phthalocyanine composition which is prepared as described in Example 3 (using a ratio of 88 grams of copper phthalocyanine with 9 grams of monosulfonyl chloride) is mixed with about 170 grams of a commercial polyamide flexographic ink vehicle. The mixture is rolled on a mill with 1,000 grams of steel balls for about 18 to 20 hours. An ink composition is produced having a low viscosity, ranging from 120 to 160 c.p.s. The ink remains unchanged except for a very slight thickening after exposure to a temperature of about 55° C. over a period of 7 days. The ink composition remains stable with no apparent change after storage at room temperature for an extended period of at least three months.

In contrast, the polyamide flexographic ink made only from dry pigmentary green shade copper phthalocyanine has a moderately high viscosity when first prepared. Upon standing for a few moments it thickens to such extent that it becomes incapable of being poured.

EXAMPLE 6

Rotogravure ink composition-nitrocellulose type

A 20-gram portion of a copper phthalocyanine blend as used in Example 5, is mixed with about 180 grams of a commercial nitrocellulose rotogravure ink vehicle. The mixture is rolled with steel balls for about 18 to 20 hours. There is produced an ink composition having a low viscosity and which tints a cellulose acetate film with a clear deep blue color.

EXAMPLE 7

Rotogravure ink composition-rubber type

A 15-gram portion of a copper phthalocyanine blend, as used in Example 5, is mixed with about 142 grams of a commercial rubber base rotogravure ink vehicle. The mixture is milled with steel balls for about 20 hours. The resulting ink composition has a very low viscosity and produces rich clear deep blue cellulose acetate prints.

The following examples illustrate the preparation of a sulfonic acid derivative and provide comparison of compositions using a sulfonyl chloride derivative with a similar composition using a sulfonic acid derivative.

EXAMPLE 8

Preparation of copper phthalocyanine monosulfonic acid

A presscake containing 65 grams copper phthalocyanine monosulfonyl chloride, prepared as described in Example 1, is slurried in about 1,500 ml. of water. A sodium hydroxide solution is added until the slurry is alkaline to phenolphthalein. The mixture is then stirred at 85° C. for about 2 hours. After being cooled, the mixture is acidified with dilute sulfuric acid and the solid product is isolated by filtration and washed acid free, producing a copper phthalocyanine monosulfonic acid.

EXAMPLE 9

A blend of copper phthalocyanine monosulfonic acid

A blend of copper phthalocyanine with copper phthalocyanine monosulfonic acid (as prepared in Example 8) is made using a procedure similar to that described in Example 3 with the exception that the sulfonic acid derivative is substituted for the phthalocyanine sulfonyl chloride derivative.

EXAMPLE 10

Comparison of sulfonyl chloride derivative with sulfonic acid derivative

By using the methods and compositions as shown in Examples 5 to 7, the rotogravure and flexographic ink compositions are prepared using a blend of copper phthalocyanine and a monosulfonic acid such as described in Example 9. The ink compositions produced have a low viscosity. However, when compared with similar inks made from copper phthalocyanine compositions using the sulfonyl chloride derivative instead of the sulfonic acid derivative, the cellulose acetate prints and prints on aluminum foil are dull, flat and cloudy by comparison, demonstrating substantially less stability than the compositions of this invention.

The present pigment compositions are useful in various compositions and systems including paints, enamels, inks, and the like. By using these pigments, such compositions and systems have superior properties of non-flocculation and non-crystallization.

EXAMPLE 11

Dry blending process

Dry pigmentary green shade copper phthalocyanine and dry copper phthalocyanine chloride, 91 parts by weight and 9 parts by weight, respectively, are ground together in a suitable vessel. The resulting blend is passed through a 40 mesh screen in order to ensure the uniformity. The polyamide flexographic ink made as described in Example 5 above from this mixture has a low viscosity and can be drawn to a transparent blue film on cellulose acetate and exhibits substantially the same stability as the composition of Example 5.

What is claimed is:
1. A pigent composition comprising a blend of (a) copper phthalocyanine and (b) about 4 to 15 parts by weight of a copper phthalocyanine monosulfonyl halide selected from the group consisting of copper phthalocyanine monosulfonyl chloride or copper phthalocyanine monosulfonyl fluoride, per 100 parts by weight of (a).
2. The pigment composition of claim 1, wherein substantially all of the copper phthalocyanine monosulfonyl halide is unhydrolyzed.
3. The pigment composition of claim 1, wherein (b) is copper phthalocyanine monosulfonyl chloride.
4. The pigment composition of claim 1, wherein (b) is copper phthalocyanine monosulfonyl fluoride.
5. An ink composition containing the pigment composition of claim 1.
6. The ink composition of claim 5 wherein the sulfonyl halide of (b) is copper phthalocyanine monosulfonyl chloride.

References Cited

UNITED STATES PATENTS

| | | | |
|---|---|---|---|
| 2,526,345 | 10/1950 | Giambalvo | 106—288 |
| 2,861,005 | 11/1958 | Siegel | 106—288 |
| 2,925,423 | 2/1960 | Weinmayr | 260—314.5 |

TOBIAS E. LEVOW, Primary Examiner

J. V. HOWARD, Assistant Examiner

U.S. Cl. X.R.

106—26, 195, 288; 260—314.5